United States Patent [19]
Brody

[11] Patent Number: 5,760,902
[45] Date of Patent: Jun. 2, 1998

[54] METHOD AND APPARATUS FOR PRODUCING AN INTENSITY CONTRAST IMAGE FROM PHASE DETAIL IN TRANSPARENT PHASE OBJECTS

[75] Inventor: Phillip S. Brody, Bethesda, Md.

[73] Assignee: The United States of America as represented by the Secretary of the Army, Washington, D.C.

[21] Appl. No.: 514,574

[22] Filed: Aug. 14, 1995

[51] Int. Cl.$^6$ .................................................. G01B 9/021
[52] U.S. Cl. .................................. 356/347; 359/7
[58] Field of Search .................................. 356/345, 347, 356/348, 353, 354; 359/7, 15

[56] References Cited

U.S. PATENT DOCUMENTS

| | | | |
|---|---|---|---|
| 4,201,473 | 5/1980 | Domenicali et al. | |
| 4,721,362 | 1/1988 | Brody et al. | 359/7 |
| 4,921,333 | 5/1990 | Brody et al. | 359/7 |
| 4,938,596 | 7/1990 | Gauthier et al. | |
| 5,235,400 | 8/1993 | Terasawa et al. | |

OTHER PUBLICATIONS

Phase–Conjugate Fizeau Interferometer, Daniel J. Gautheir and Robert W. Boyd, Robert K. Jungquist, Jerold B. Lission and Lyon Voci; Mar. 15, 1989, vol. 14 No. 6, Optics Letters.

*Primary Examiner*—Samuel A. Turner
*Attorney, Agent, or Firm*—Freda L. Krosnick; Paul S. Clohan; Charles H. Harris

[57] ABSTRACT

A method and apparatus for producing images in which phase variation introduced by reflections from a transparent phase object are represented in interference generated phase contrast, and in which gradients in phase introduced by transmission through the phase modulating object or plate are represented in phase gradient contrast. Combination interference generated phase contrast-phase gradient contrast images are also produced. A laser beam is directed by a beam splitter through the transparent phase and falls onto a photorefractive crystal where a temporary hologram forms. The hologram generates the phase conjugate of the transmitted beam which moves back through the plate, so the phase distortions introduced by the transparent phase object are removed in the back propagating beam. This beam interferes with a specularly reflected beam from the transparent phase object. The change in the interference pattern when the object is displaced in the beam direction yields an interference generated phase contrast image of the phase shifts introduced by reflection from the plate. An image of gradients in phase introduced by the plate or other phase object can be also produced by shifting the object in the lateral direction. Images before displacement and after displacement are digitally acquired and subtracted to produce images of the introduced phase in interference generated phase contrast; in phase gradient contrast; and combined axial and lateral shifts in combined interference generated phase contrast, phase gradient contrast. The digital images are displayed on a video monitor.

16 Claims, 4 Drawing Sheets ns*5,760,902*

METHOD AND APPARATUS FOR PRODUCING AN INTENSITY CONTRAST IMAGE FROM PHASE DETAIL IN TRANSPARENT PHASE OBJECTS

RIGHTS OF THE GOVERNMENT

The invention described herein may be manufactured, used, and licensed by or for the United States Government for Governmental purposes without payment to me of any royalty thereon.

FIELD OF THE INVENTION

The present invention relates to a method and apparatus for producing an intensity contrast from phase detail in a transparent phase object. More particularly, the invention relates to a method and apparatus for producing an interference generated phase contrast image, or a phase gradient contrast image, or a combination interference generated phase contrast, phase gradient contrast image. The invention is particularly suited for the microscope imaging of phase shift photomasks.

DESCRIPTION OF THE PRIOR ART

Phase modulating photomasks are used to project intensity patterns in semiconductor wafer printers. These masks, because of their complexity and cost, require careful microscopic inspection of their phase shifting structures before use and additional qualifying inspections during use. Inspection of these masks and the more conventional intensity masks is also important with respect to phase modulating defects appearing as intensity spots in the projected image.

These phase structures and phase defects cannot, however, be effectively imaged by ordinary optical means such as conventional bright field microscopy. While certain microscope phase imaging techniques such as Zernicke phase contrast, interference microscopy and differential interference contrast microscopy, can produce representation of phase structure, these methods are generally inadequate with respect to sensitivity and resolution for adequate inspection. Scanning laser microscopy is also applicable to these imaging tasks but again can be inadequate in phase sensitivity and resolution to meet inspection needs.

Prior related coherent light methods of microscopic imaging phase objects to produce images called phase gradient contrast images are described in U.S. Pat. Nos. 4,721,362 to Brody et al. and 4,921,333 to Brody et al., assigned to the U.S. Government and hereby incorporated by reference herein. These methods produce images of gradients in a specified direction, of phase deformation introduced into fronts of constant phase as the result of the transmission of a coherent beam through a phase object. The deformations result from variations in the optical path lengths of the transmitted beam; these are produced by variations of thickness and variations of refractive index. The phase gradient contrast images produced will show lateral gradients in these phase modulating structures.

Phase gradient methods are useful for examining the structure of phase shift photomasks and other phase structures. However, since they do not create an image representing phase shift directly, but rather show gradients in phase, the images are some times difficult to interpret in terms of phase shift. For example, larger areas which shift phase uniformly with boundaries outside the microscope field cannot be directly distinguished from non-phase shifting areas, both showing the same uniform intensity. To distinguish such phase shifting regions from non-phase shifting regions, a direct visualization of phase with respect to some reference level is required. Such images are called phase contrast images.

Direct visualization of phase resulting in phase contrast rather than phase gradient contrast is possible using the incoherent light method of Zernicke phase contrast or methods of interference generated phase contrast but these lack adequate sensitivity for many purposes. Zernicke phase contrast also introduces certain artifacts into the image which can confuse interpretation of these images.

In the prior art, with regard to both the coherent imaging methods of the aforementioned patents, and conventional incoherent light methods, there is no simple direct method of producing combination images of phase contrast and phase gradient contrast. Such combination images would be useful with the phase gradient components of the image identifying small defect regions. The combination images show features involving spatially abrupt phase modulation like edges and small point defects as well as large areas of shifted phase.

Additionally, the introduction of phase contrast to phase gradient contrast images separates a uniform background from a phase shifted area, providing contrast between the two. Such contrast is particularly useful in delineating, for example, small biological objects such as single cells including bacteria for the purpose of automated counting.

A special problem with the earlier methods for phase gradient contrast microscope imaging found in U.S. Pat. Nos. 4,721,362 and 4,921,333 can result from fringes produced by the interference of specularly reflecting light surface so that the specularly reflected light from a phase plate and the beam are transmitted back through the plate. The result is an obscuration of phase gradient detail. This can be avoided by increasing the tilt of the phase plate with respect to the beam back propagating into the microscope objective until the specularly reflected light does not enter the objective pupil. This method, though effective in removing fringes, has disadvantages. First, a compensating tilt in the microscope axis is needed to bring the full field simultaneously in focus. Provision for such tilting is not made in normal microscope design. Second, use of large tilts generally make it necessary to use longer working distance objectives of lower numerical aperture and thus lower resolving power.

Another problem arises because the phase gradient methods of the aforementioned patents involve only the transmitted beam. Although the effects of surface relief, on transmission, show up in such images, these cannot be separated from phase modulating effects within the bulk of the plate.

Accordingly, it is an object of the present invention to provide a method and apparatus for producing an interference generated phase contrast image of a phase shift photomask and other phase objects in which relative phase variation are produced by variations in thickness.

It is another object of the present invention to produce with the same apparatus an image which shows gradients in phase introduced by transmission as phase gradient contrast images and phase gradient contrast images in which coherent artifacts are absent.

It is still another object to produce either combination phase gradient contrast-interference generated phase contrast images or separate phase gradient contrast and interference generated phase contrast images.

A further object is to produce phase gradient laser images without fringes while maintaining the microscope axis parallel to the beam direction and perpendicular the phase plate surface, and also maintaining the plate perpendicular to the beam.

SUMMARY OF THE INVENTION

According to the invention, a method of producing an interference generated, phase contrast image, includes the steps of generating a polarized beam of collimated coherent light, splitting the beam of collimated coherent light into a first beam and second beam with a first beam splitter, splitting the first beam into third beam and fourth beam with a second beam splitter.

The third beam is directed to a transparent phase object substantially located on a plane, whereupon a first portion of the third beam is passed through the transparent phase object into a photorefractive holographic means, for producing and recording a hologram of the transparent phase object and for generating a phase conjugate beam of the transparent phase object from the beam of collimated coherent light.

The phase conjugate beam is split into a first conjugate beam and a second conjugate beam with the second beam splitter, and the second conjugate beam is split into a third conjugate beam and a fourth conjugate beam with the first beam splitter. The third conjugate beam is directed with the first beam splitter to intercept a ground glass to produce a first spot viewed from above. A second portion of the third beam is reflected from the transparent phase object to form a specularly reflected beam, and the entry of the specularly reflected beam into the second beam splitter is adjusted with a phase plate adjustment means. The specularly reflected beam is split into a first and second reflected beam with the second beam splitter, and the second reflected beam is split into a third reflected beam and a fourth reflected beam with the first beam splitter. The third reflected beam is directed with the first beam splitter to intercept the ground glass to produce a second spot viewed from above. The position of the second spot is adjusted with the plate adjustment means so that it falls coincident on the first spot, resulting in the first conjugate beam and the first reflected beam forming coincident beams.

The now coincident phase conjugate beam passing through the second beam splitter and specularly reflected beam passing through the second beam splitter are intercepted with a image forming optical system and a first image formed by the image forming system is recorded. The relative distance between the hologram and the transparent phase object is shifted a fraction of a distance incommensurate with a wave length, whereupon a second image formed by the image forming means is recorded. The first image is subtracted from the second image to obtain an interference generated phase contrast image.

According to another aspect, the step of shifting the relative distance between the hologram and the transparent phase object includes shifting the transparent phase object an incremental lateral distance, and the step of subtracting the first image from the second image results in obtaining a combination interference generated phase contrast, phase gradient contrast image.

According to another aspect, prior to the step of intercepting the coincident beams with an image forming optical system, a lens is positioned between the first beam splitter and the ground glass, and an interference pattern of fringes is projected by the lens. The adjusting means is utilized until the pattern is symmetric about a central node.

Preferably, the first and second beam splitters are 45° uncoated pellicle beam splitters.

According to another aspect, after the step of generating the polarized beam of collimated coherent light, the polarization of the beam is rotated to lie in the plane of the beam splitter.

According to yet another aspect, the thickness of the beam splitter is adjusted for maximum reflectivity at the wavelength of the laser beam.

Preferably, the phase plate adjustment means includes at least one mechanical adjuster or piezoelectric adjuster, and the optical imaging system includes a microscope and a video camera.

Also preferably, recording means includes a frame grabber with pixelated digital storage of the image and the subtracting means includes a digital process.

It is further preferred that the hologram is a photorefractive hologram of a barium titanate crystal in which preferably, the hologram is temporarily recorded.

According to another embodiment, a method of producing a phase gradient image, may include the steps of generating a beam of collimated coherent light, splitting the beam of collimated coherent light into a first beam and second beam with a first beam splitter, splitting the first beam into third beam and fourth beam with a second beam splitter.

The third beam is directed to a transparent phase object substantially located on a plane, whereupon a first portion of the third beam is passed through the transparent phase object into a photorefractive holographic means, for producing and recording a hologram of the transparent phase object and for generating a phase conjugate beam of the transparent phase object from the beam of collimated coherent light. The phase conjugate beam is split into a first conjugate beam and a second conjugate beam with the second beam splitter, and the second conjugate beam is split into a third conjugate beam and a fourth conjugate beam with the first beam splitter. The third conjugate beam is directed with the first beam splitter to intercept a ground glass to produce a first spot viewed from above. A second portion of the third beam is reflected from the transparent phase object to form a specularly reflected beam, and the entry of the specularly reflected beam into the second beam splitter is adjusted with an adjustment means. The specularly reflected beam is split into first and second reflected beams with the second beam splitter, and the second reflected beam is split into a third reflected beam and a fourth reflected beam with the first beam splitter.

The third reflected beam is directed with the first beam splitter to intercept the ground glass to produce a second spot viewed from above. The position of the second spot is adjusted with the adjustment means so that it falls coincident on the first spot, resulting in the first conjugate beam and the first reflected beam forming coincident beams. The now coincident phase conjugate beam passing through the second beam splitter and the specularly reflected beam passing through the second beam splitter are intercepted with an image forming optical system and a first image formed by the image forming system is recorded. The transparent phase object is shifted an incremental lateral distance, whereupon a second image formed by the image forming means is recorded. The first image is subtracted from the second image to obtain phase gradient contrast image.

According to yet another preferred embodiment, a method of producing a combination interference generated phase contrast, phase gradient contrast image, includes the steps of generating a beam of collimated coherent light, splitting the beam of collimated coherent light into a first beam and second beam with a first beam splitter, splitting the first beam into third beam and fourth beam with a second beam splitter. The third beam is directed to a transparent phase object substantially located on a plane, whereupon a first portion the third beam is passed through the transparent phase object into a photorefractive holographic means, for producing and recording a hologram of the transparent phase object and for generating a phase conjugate beam of the transparent phase object from the beam of collimated coherent light.

The phase conjugate beam is split into a first conjugate beam and a second conjugate beam with the second beam splitter, and the second conjugate beam is split into a third conjugate beam and a fourth conjugate beam with the first beam splitter. The third conjugate beam is directed with the first beam splitter to intercept a ground glass to produce a first spot viewed from above. A second portion of the third beam is reflected from the transparent phase object to form a specularly reflected beam, and the entry of the specularly reflected beam into the second beam splitter is adjusted with an adjustment means. The specularly reflected beam is split into a first and second reflected beam with the second beam splitter, and the second reflected beam is split into a third reflected beam and a fourth reflected beam with the first beam splitter. The third reflected beam is directed with the first beam splitter to intercept the ground glass to produce a second spot viewed from above. The position of the second spot is adjusted with the adjustment means so that it falls coincident on the first spot, resulting in the first conjugate beam and the first reflected beam forming coincident beams. The now coincident phase conjugate beam passing through the second beam splitter and the specularly reflected beam passing through the second beam splitter are intercepted with a image forming optical system and a first image formed by the image forming system is recorded.

The relative distance between the hologram and the transparent phase object is shifted a fraction of a distance incommensurate with a wave length, and the transparent phase object is shifted an incremental lateral distance, whereupon a second image formed by the image forming means is recorded. The first image is subtracted from the second image to obtain a combination interference generated phase contrast, phase gradient contrast image.

According to a further embodiment, a method of producing a combination interference generated phase contrast, phase gradient contrast image, includes the steps of generating a beam of collimated coherent light, directing the beam through a transparent phase object, passing a first portion of the beam through the transparent phase object into a photorefractive holographic means, for producing and recording a hologram of the transparent phase object and for generating a phase conjugate beam of the transparent phase object from the beam of collimated coherent light, reflecting a second portion of the beam from the transparent phase object to form a specularly reflected beam, adjusting the specularly reflected beam and the phase conjugate beam to form coincident beams, forming and recording an image of the coincident beams, shifting the transparent plate object laterally and axially to form a modified beam, forming and recording a second image of the modified beam, and subtracting the first image from the second image to obtain an interference generated phase contrast, phase gradient contrast image.

According to yet another embodiment, a method of producing a combination interference generated phase contrast, phase gradient contrast image, includes the steps of forming and recording a first image of a beam of collimated coherent light projected through a transparent phase object, shifting the transparent phase object in two orthogonal directions, i.e., in vertical and lateral directions, forming and recording a second image of a beam of collimated coherent light projected through the shifted transparent phase object, and subtracting the first image from the second image to obtain an interference generated phase contrast, phase gradient contrast image.

The invention also includes a microscope for phase imaging of a transparent phase object including a source for a beam of collimated coherent light, a first beam splitter receiving and splitting the light beam into first and second beams, and a second beam splitter receiving and splitting the second beam into third and fourth beams. A stage is provided for supporting the transparent phase object, and the third beam enters the transparent phase object at the stage. A first portion of the third beam is reflected by the transparent phase object to form a specularly reflected beam. The microscope also includes means for adjusting the angular tilt of the stage, means for shifting the position of the stage in at least two orthogonal directions, i.e., in vertical and lateral directions, and a photorefractive hologram recording crystal receiving a second portion the third beam and forming a photorefractive hologram, the crystal generating a phase conjugate beam. A ground glass plate forms spots from the phase conjugate beam and the specularly reflected beam. The microscope includes an objective for receiving an image of the beam, and a processor for recording and comparing at least two images.

The above and other objects, features and advantages of the present invention will become apparent from the following description and the appended claims taken in conjunction with accompanying drawings.

DESCRIPTION OF THE PREFERRED EMBODIMENTS

The preferred embodiment is an inspection microscope for visualizing in interference generated phase contrast, or in phase gradient contrast, or in combination interference generated phase contrast, phase gradient contrast, phase shifting structure and defects in a transparent phase object, such as phase shifting masks. The invention is also suitable for imaging a variety of transparent biological applications such as unstained tissue sections and individual cells, as well as other phase objects. The output images are in digital form; they are thus useful not only for display but also for quantitative measurement of the imaged quantities.

Figure 1:
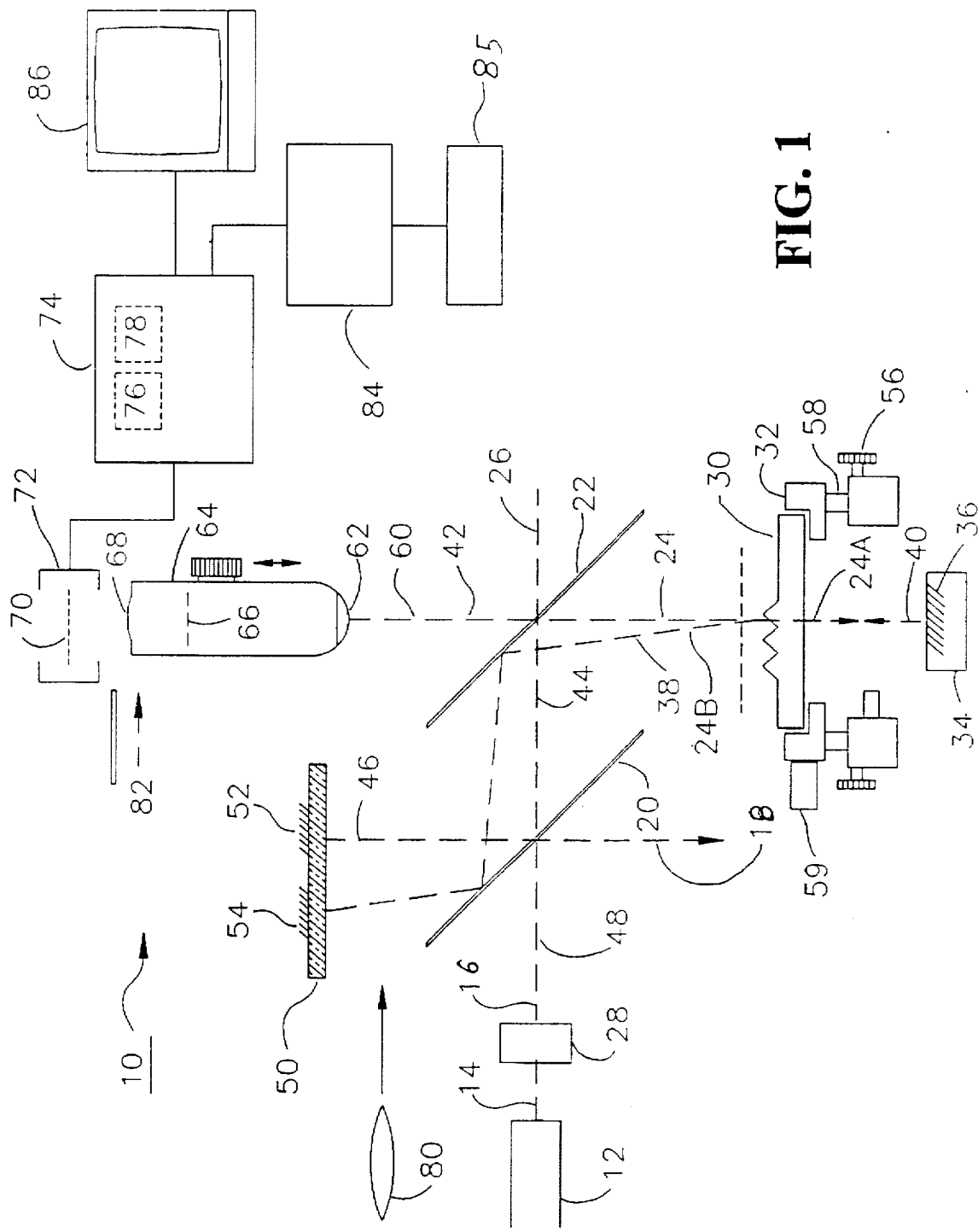
FIG. 1 shows a two beam splitter arrangement of the components of the preferred embodiment.

With reference to FIG. 1, a holographic microscope system for phase imaging is shown generally as 10. A light source such as laser 12 may produce a polarized collimated laser output beam 14. Laser beam 14 is split into two beams, first beam 16 and second beam 18, by a first beam splitter 20. After passing through first beam splitter 20, first beam 16 passes through to a second beam splitter 22, whereupon first beam 16 is split into a third beam 24 and a fourth beam 26. Second beam 18 and fourth beam 26 are not used. Preferably, first beam splitter 20 and second beam splitter 22 are 45° uncoated pellicle beam splitters. A quarter waveplate 28 is provided to rotate the polarization of beam 14 for maximum reflection off uncoated pellicle beam splitter 22.

Third beam 24 is reflected downwardly by second beam splitter 22 through a transparent phase object 30, such as a phase shift reticle mask plate. Transparent phase object 30 is mounted on a stage 32, which allows the position of the transparent phase object to be shifted in two orthogonal directions. A first portion 24A of third beam 24 exits from transparent phase object 30 into a photorefractive hologram recording crystal 34 where it forms photorefractive hologram 36 after a relatively short formation time. Preferably, crystal 34 is a single crystal of barium titanate with a crystal axis specifically oriented with respect to the laser beam polarization and direction of incidence, as known in the art. A second portion 24B of third beam 24 is specularly reflected by transparent phase object 30 to form a specularly reflected beam 38.

Hologram 36 generates a phase conjugate beam 40. The phase conjugate beam travels in the opposite direction of third beam 24 and back through transparent phase object 30, where the phase distortions introduced by transparent phase object 30 are removed from phase conjugate beam 40. More specifically, the fronts of the constant phase of this retro-propagating phase conjugate beam 40 are identical in form to those of the third beam 24 passing into the plate. However, with the direction of propagation reversed, the phase effects are corrected. Phase conjugate beam 40 enters second beam splitter 22 and is split into a first conjugate beam 42 and a second conjugate beam 44. First conjugate beam 42 enters an objective 62 of a microscope 64. Second conjugate beam 44 enters first beam splitter 20 and is split into a third conjugate beam 46 and a fourth conjugate beam 48. Fourth conjugate beam 48 is passed back into laser 12. Third conjugate beam 46 is reflected by first beam splitter 20 to a ground glass plate 50 and forms a stationary spot 52 viewed from above. Specularly reflected beam 38 is similarly reflected by second and first beam splitters 22, 20 to ground glass plate 50 to form a spot 54, again as viewed from above.

Coarse mechanical adjusters 56 and fine piezoelectric actuators 58 are provided to tilt stage 32 and/or transparent phase object 30 in any of all of three dimensions to adjust the direction of specularly reflected beam 38. Adjustment of beam 38 such that spot 54 is coincident with stationary spot 52 produces coincident beams 60. The same fine piezoelectric actuators 58 can be used to vertically displace stage 32 in the direction of coincident beams 60. The transparent phase object 30 can also be laterally displaced a small distance in a specified direction in a short amount of time by fine piezoelectric actuators 59.

When third conjugate beam 46 and specularly reflected beam 38 are aligned so as to be coincident, the interference between the fronts of constant phase from third conjugate beam 46 and specularly reflected beam 38 produce intensity patterns. The intensity patterns are imaged with a microscope objective. Specifically, coincident beams 60 enter objective 62 of microscope 64 to form an aerial image 66. If the beams are correctly aligned, and the variation in phase resulting from the reflection are within one wavelength, image 66 is an interference generated phase contrast image resulting from the interference of specularly reflected beam 38 and phase conjugate beam 40. A relay lens 68 is used to project aerial image 66 onto a video sensing plate 70 of a video camera 72. The video output of camera 72 is transmitted to an image processor 74, where the output may be digitized and stored, for example, in image storage planes 76, 78. A computer 84 controls frame grabbing accession by storage planes 76 and 78. Computer 84 creates and transmits a synchronized and delayed signal to electronic drivers (not shown) for piezoelectric actuators 58 and 59. Images from processor 84 are displayed on video monitor 86.

The interference generated phase contrast image is, however, typically in poor contrast and characterized by coherent artifacts and internal produced interference fringes. A high contrast artifact free image is obtained by an electronic processing method including the steps of 1) electronically capturing this initial image and digitizing it and storing it in a pixelated memory plane, and 2) shifting the mask a specified distance in the beam direction, i.e., an axial shift. This produces a change in the image, for example, a bright region relative to the background resulting from constructive interference becomes a dark region as the result of destructive interference. This new image is similarly captured, digitized and stored. Processing then subtracts the fist image from the second and converts the difference to image form; this image is then displayed on video monitor 86.

Adjustment of the specularly reflected beam 38 to coincide with third conjugate beam 46 by superimposition of spots 52 and 54 results in general alignment of the beams. A more exact alignment is, however, generally required and is obtained by positioning a low power microscope objective 80 between first beam splitter 20 and ground glass plate 50, the objective projecting an interference fringe pattern. Coarse mechanical adjusters 56 and fine piezoelectric actuators 58 are used to tilt stage 32 until the fringe pattern is symmetric about a central node. The fringe pattern may also be viewed on a ground glass plate 82 placed at the position of the aerial image.

The holographic microscope system 10 as described can be used for producing a phase gradient contrast image. As in the interference generated phase contrast, a first image, resulting from coincident beams 60, is captured, digitized and stored. The phase conjugate beam 40 returns from the crystal with deformations in fronts of constant phase which are the result of the transmission. When the beam passes back through transparent phase object 30, the deformations are removed by the transmission through the refractive pattern of the phase plate. Thus, the illumination field does not contain the effect of these phase front deformations; rather, the field contains only background and coherent artifacts. The transparent phase object 30 is shifted laterally. When this is done, the phase distortions and their related intensity patterns produced on propagation, are added to the beam. These patterns originate because the phase conjugate beam passes, not through transparent phase object 30, but through the object shifted; they show gradients, in the shift direction, of phase deformations introduced into a coherent transmitted beam.

Images before the displacement and after the displacement are digitally acquired and subtracted to produce images of phase shift in interference generated phase contrast; in phase gradient contrast; and by the use of combined axial and lateral shifts in combined interference generated phase contrast, phase gradient contrast.

Operation of the microscope will now be described. The laser light beam 14, passing through first and second beam splitters 20, 22, enter transparent phase object 30, whereupon portion 24A of third beam 24 enters photorefractive hologram recording crystal 34 and forms hologram 36. Hologram 36 generates phase conjugate beam 40. Second portion 24B of third beam 24 is reflected by transparent phase object 30 and forms specularly reflected beam 38.

Phase conjugate beam 40 travels through transparent phase object 30 and second beam splitter 22. First conjugate beam 42 enters microscope objective 62 and is imaged by the objective and stored.

Specularly reflected beam 38 is generally aligned to phase conjugate beam 40 by superimposition of spots 52 and 54. To achieve more exact alignment, low power microscope objective 80 is moved into position between beam splitter 20 and ground glass 50. Stage 32 is then adjusted until the fringe pattern is symmetric about a central node. The image resulting from the coincident phase conjugate beam 40 and specularly reflected beam 38 is imaged by objective 62.

A control signal from the operator from a keyboard 85 then stores this image and simultaneously directs the processor to initiate the desired shifts in the transparent phase object 30 so as to generate the phase gradient contrast and/or interference generated phase constant image. If a phase gradient image is desired, only a lateral shift is used; if a phase contrast image is desired, an axial fractional wave length shift is used. If a combination is desired both shifts are simultaneously initiated. The magnitudes of the desired shifts have been preset by setting the signals to the actuators. The image following these shifts is also stored. These images in the form of video camera outputs are digitized and stored in image storage planes 76 and 78. In obtaining the first and second stored images, a preset interval of time is allowed to elapse, the interval being sufficient in duration to allow completion of the shifts but not long enough to resulting in overwriting illumination of the hologram. A typical time duration is 100 milliseconds.

The digitized image stored in storage plane 76 is subtracted from the second image stored in storage plane 78 to create a final gray scale image which is displayed on the monitor. Produced are either (1) the interference generated phase contrast form of phase contrast image, or (2) the phase gradient contrast or (3) a combination of the two.

The contrast of the images depend on the magnitudes of the shift. Since the contrasts can be controlled independently in the component images, the relative contrast of the phase gradient and phase contrast image in the combination image can be controlled.

The phase conjugate beam has smooth undistorted fronts, while the reflected beam contains variations, that is, regions in which the phase is retarded or advanced. As long as these variations are small relative to a wavelength, the interference pattern at the exit of the phase conjugate beam from the plate shows, in interference generated phase contrast, these variations as a continuous gray scale pattern. This pattern is imaged by the objective. Although the contrast is generally limited, it can be increased by shifting the plate by a fraction of a wavelength. This produces a change which captures in high contrast a processed image representing the difference between the initial pattern and that produced by the shift. The processing requires the capture of the initial pattern as a digitized image on a memory storage plane and the capture of post-shift image on a memory plane, followed by the digital subtraction first image from the second image.

The shift may also produce enhanced contrast in the optical image as the result of a reduction in reflectivity of a specularly reflected beam which results from a special interaction between the beam and the retropropagating phase conjugate of the transmitted beam which reduces the specular reflectivity of the plate. However, when the transparent phase object undergoes an axial shift in the direction of the incident beam there is an increase in reflectivity which may be used to enhance the contrast of the optical interference pattern and likewise the processed image.

The interference image can be obtained independently of the gradient image by using only an axial shift. The phase gradient image can be obtained without the superimposed interference image by eliminating the axial shift.

Complete alignment of the coincident beams is important for the following reason. If the beams are not completely aligned, but rather enter the objective at an angle to each other, tilt fringes are created. These will move with shifts creating as a result high contrast interference patterns in the final processed image. Although these patterns contain information on phase deformations of the specularly reflected beam, the patterns can be difficult to interpret. When the alignment is complete, i.e., by using the low power microscope objective 80 and/or ground glass 82, there is only a single fringe in the optical field and shifts of plus or minus a fraction of a wavelength spatially distributed result in variations of intensity. These patterns are easy to interpret and have the general characteristic of a phase contrast image of the reflecting surface.

Figure 2:
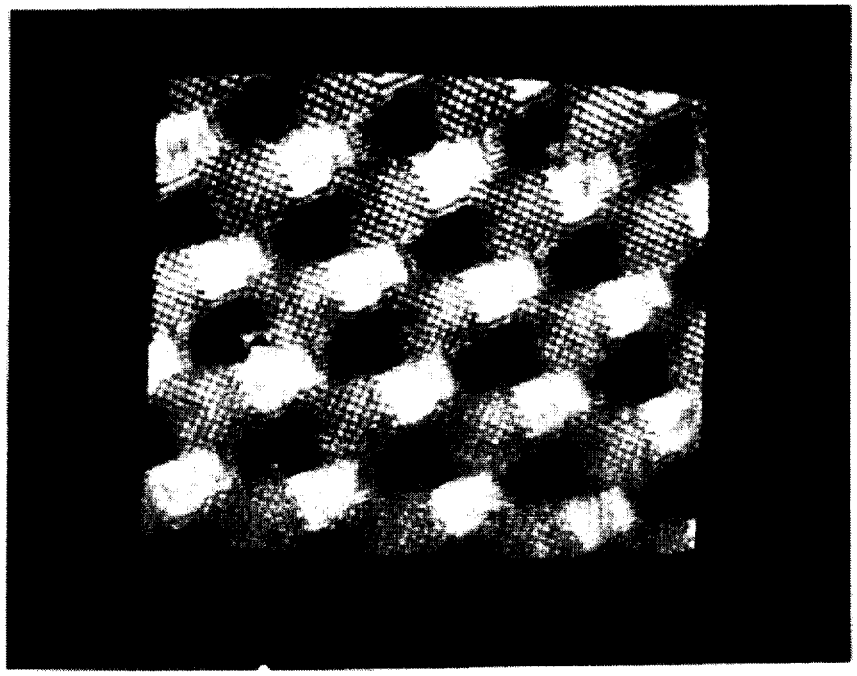
FIG. 2 is a photograph of a video display showing a phase shift photomask in interference generated phase contrast.

FIG. 2 is a photograph of the video display of a processed image, showing interference generated phase contrast. The object is a transparent phase shift mask designed for use in microlithographic projector. The bright areas are those with phase shifted as the result of reflection from etched back structures. FIGS. 2–5 show a scale indicating 20 micrometer reference length. The magnification of the on page image is approximately 1000 X.

In earlier related designs described in U.S. Pat. Nos. 4,721,362 and 4,921,333, obscuring tilt fringes are avoided in phase gradient contrast images by increasing the angle between the reflected and phase conjugate beam to the point the specularly reflected beam does not enter the microscope objective. This has several disadvantages. It requires a compensating tilt in the microscope axis so as to bring the full field simultaneously in focus. Because of the tilt, the required working distance of the objectives is increased. The tilt can also require a portion of the aperture to be occluded. These requirements, in practical terms, result in the use of objectives of lower maximum numerical aperture with longer working distances and also limit the maximum useable numerical aperture of those objectives. The preferred embodiment of this invention uses a vertical arrangement for the microscope and there is a resulting improvement in resolution. High resolution phase gradient contrast images without tilt fringes can be obtained; however, when the specularly reflected and phase conjugate beam are aligned by the alignment methods. Tile fringes do not appear and any interference pattern remaining does not shift with the lateral shift and is thus removed by the subtraction processing.

Figure 3:
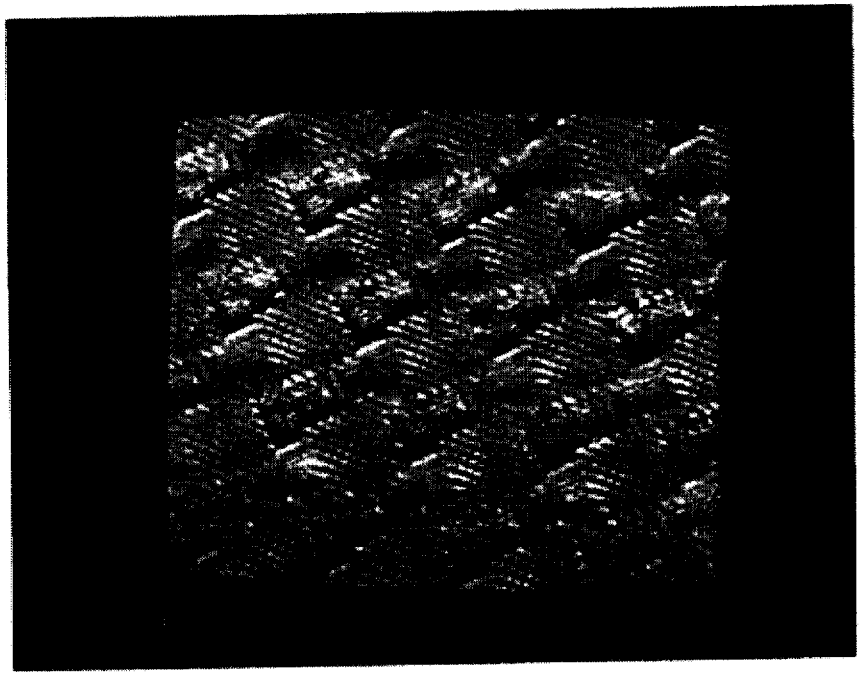
FIG. 3 is a photograph of the video display of a phase shift photomask in phase gradient contrast.
Figure 4:
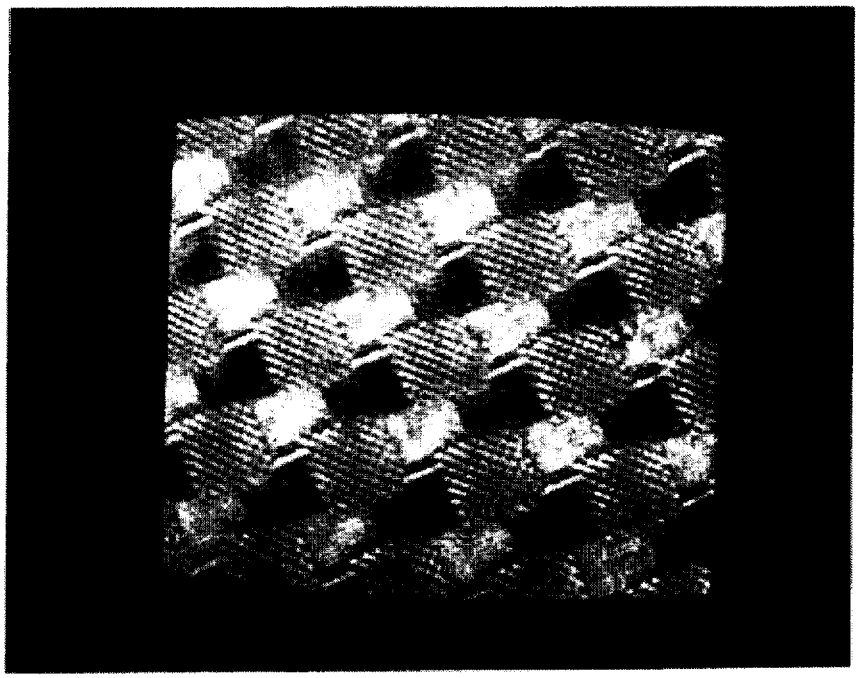
FIG. 4 is a photograph of the video display of a phase shift photomask in combined interference generated phase contrast and phase gradient contrast.

FIG. 3 is a photograph of the video display of a processed image, showing phase gradient contrast of the phase shift mask shown in interference generated phase contrast in FIG. 2.

The present invention also allows combined interference generated phase contrast, phase gradient contrast images. This is demonstrated in FIG. 4. This is a photograph of the video display of a processed image of the phase shift mask shown in FIGS. 2 and 3 showing combined interference generated phase contrast and phase gradient contrast.

Figure 5:
FIG. 5 is a photograph of video display of an exfoliated cheek cell in combined interference generated phase contrast, phase gradient contrast.

The use of combined interference generated phase contrast is particularly useful for viewing small isolated objects such as a cell because of the contrast it provides between the object and the background along with the additional detail provided by the phase gradient image. It also provides contrast which emphasizes certain features as a result of their phase shifting character. FIG. 5 is a photograph of the video display. The object is an exfoliated cheek cell and combined phase contrast and phase gradient contrast is shown. There is contrast between the background and the object and detail resulting from the phase gradient contrast. There is also contrast between the cell body and the cell nucleus, a result of the phase contrast component of the image.

There is also a theoretically expected and experimentally verified diminution in the amplitude of the specularly reflected light and, generally, reduced contrast in initial interference patter, a result of special properties of a phase conjugate beam multiply reflected between the phase conjugate mirror which is the reflection from the temporary hologram in the crystal and the beam reflected form the phase plate. Additional amplitude in the specularly reflected beam appears, however, with the shift to effect an increase of contrast in the interference generated phase contrast image.

The simplest case is where variations in phase in the reflected beam results from variations in the surface topography of the reflection surface. In less simple cases, variations in phase are produced by variations of optical thickness of a transparent specimen, for example, a cell or a tissue section contained between the surface of a glass slide and a cover glass. Here, the a phase contrast image can be created by interference of the reflection from the surface of the slide as modified by variations in the optical thickness of the cell or section creating phase variations in this reflected wavefront. In this situation contrast can be increased by enhancing the reflectivity of the slide surface with a semitransparent coating as to equalize the image of the reflective and phase conjugate beams.

A lateral shift of the phase plate in the plane of the plate, simultaneously with the axial shift in the direction of the beam, results in a superimposed phase gradient contrast, phase interference generated phase contrast image. The inclusion of phase gradient contrast emphasize edges. The combined image is an enhanced image which better visualizes structural details in the objects. The interference generated phase contrast image can, however, be obtained if desired, separately from the combined image by eliminating the lateral shift and likewise the phase gradient image can be obtained separately from the phase contrast image by eliminating the axial shift. The images are independent because the axial shift only weakly introduces a total phase shift, and the lateral shifts, if the beams are aligned do not significantly affect the interference pattern.

Optionally, only one beam splitter may be used, whereupon the microscope objective is used as a lens to project the interference pattern of the beam reflected off the surface of the plate and the phase conjugate beam which passes through the beam splitter while the adjustment means is used to adjust the plate angle so that the pattern is symmetric about a single node.

Once the beams are adjusted to be coincident, the microscope views this single central node and it is within this node the interference generated phase contrast image is generated.

For initial adjustment, the microscope can be effectively removed and the two beams allowed to fall on a screen, for example a ground glass screen, while the adjustment means is used to move the reflected spot so it is coincident with the fixed spot from the phase conjugate beam.

To produce the interference generated phase contrast image, or the phase gradient contrast image without the interference of tilt fringes, or a combination interference generated phase contrast, phase gradient contrast image it is necessary to align the retropropagating phase conjugate beam coming from the crystal back through the object with the reflected beam from the phase object. Although we have shown how to this using an arrangement using two beam splitters and a ground glass screen, other methods accomplishing the same can be used. A simple way is to remove the video microscope arrangement and allow the two beams to fall projected on a screen, then aligning the spots as before using the adjustment means. For a very fine alignment adjustment the microscope can be returned so that it intercepts the path of the two coincident beams and an areal image of the interference pattern be observed on a screen or by alternate means such as a video camera and the interference pattern adjusted by the adjustment means so that it is symmetric about a central node. Once the beams are adjusted to be coincident the video microscope arrangement views this central node and it is within this node that the interference generated phase contrast image is generated, or the phase gradient image without interfering tilt fringes or the combination phase contrast, phase gradient contrast image without interfering tilt fringes.

Figure 6:
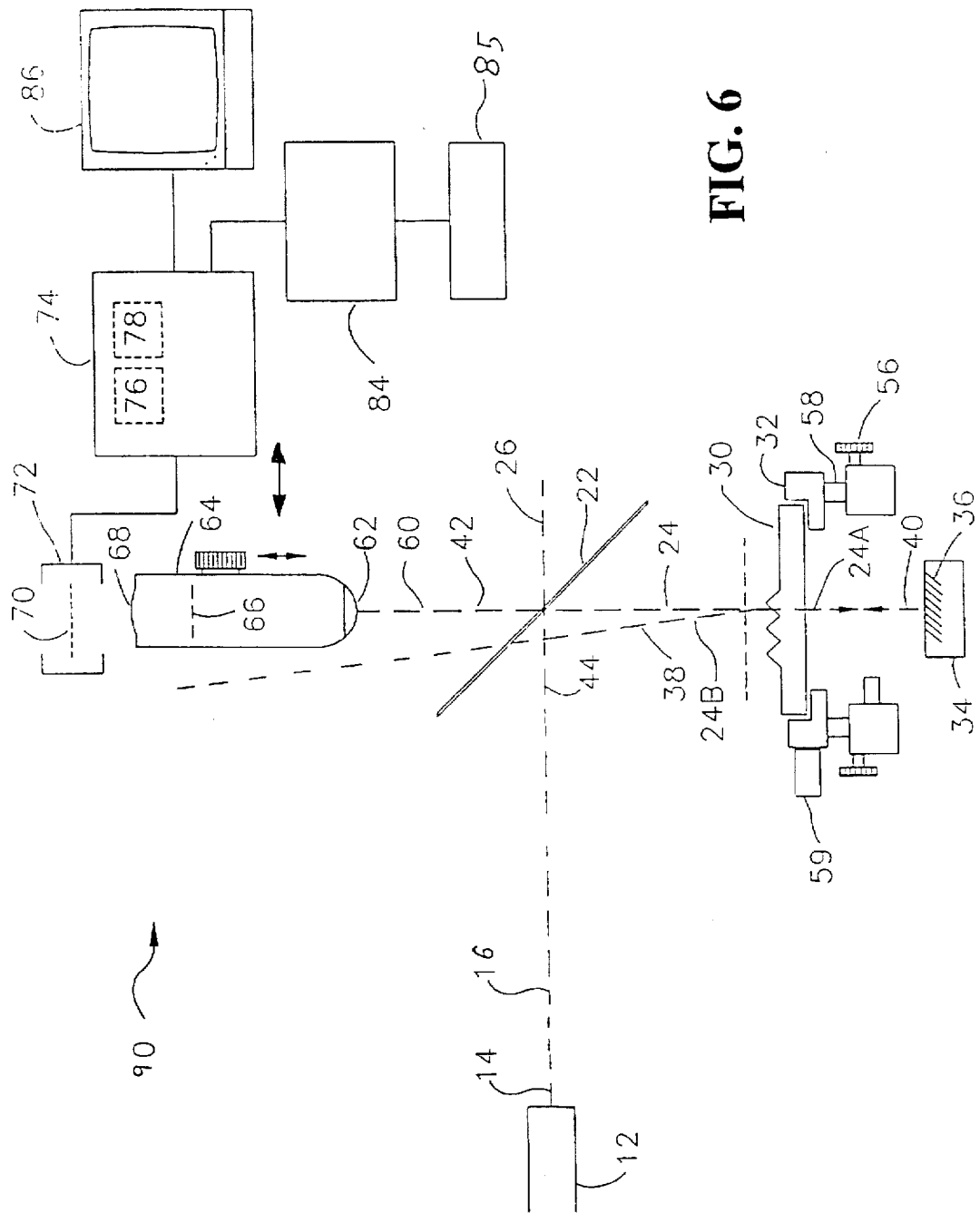
FIG. 6 shows another embodiment of the invention having a single beam splitter.

FIG. 6 shows a holographic microscope system 90 having a single beam splitter arrangement. A light source such as laser 12 may produce a laser beam 14. Laser beam 14 is split into two beams, first beam 16 and second beam 24, by beam splitter 22. Beam 26 is not used. Preferably, the beam splitter is 45° uncoated pellicle beam splitters.

Beam 24 is reflected downwardly by the beam splitter through a transparent phase object 30, such as a phase shift reticle mask plate. Transparent phase object 30 is mounted on stage 32, which allows the position of the transparent phase object to be shifted in two orthogonal directions, i.e., vertical and horizontal directions. A first portion 24A of beam 24 exits from transparent phase object 30 into photorefractive hologram recording crystal 34 where it forms photorefractive hologram 36 after a relatively short formation time. Preferably, crystal 34 is a single crystal of barium titanate with a crystal axis specifically oriented with respect to the laser beam polarization and direction of incidence, as known in the art. A second portion 24B of beam 24 is specularly reflected by transparent phase object 30 to form a specularly reflected beam 38.

Hologram 36 generates a phase conjugate beam 40. The phase conjugate beam travels in the opposite direction of third beam 24 and back through transparent phase object 30, where the phase distortions introduced by transparent phase object 30 are removed from phase conjugate beam 40. More specifically, the fronts of the constant phase of this retropropagating phase conjugate beam 40 are identical in form to those of beam 24 passing into the plate. However, with the direction of propagation reversed, the phase effects are corrected. Specularly reflected beam 38 passes through the beam splitter to form a spot (not shown) as viewed from above. It is contemplated that the microscope 64 and video imaging equipment is displaced from a first position over the object 30 in the direction of the horizontal arrows to align beams 24, 38. After the alignment of coincident beams 60, the microscope and video imaging equipment is returned to the first position over the transparent phase object.

Coarse mechanical adjusters 56 and fine piezoelectric actuators 58 are provided to tilt stage 32 and/or transparent phase object 30 in any of all of three dimensions to adjust the direction of specularly reflected beam 38. Adjustment of beam 38 such that the spot (not shown) is coincident with a stationary spot (not shown) produces coincident beams 60. The same fine piezoelectric actuators 58 can be used to vertically displace stage 32 in the direction of coincident beams 60. The transparent phase object may be laterally displaced a small distance in a specified direction in a short amount of time by fine piezoelectric actuators 59.

When beam 24 and specularly reflected beam 38 are aligned so as to be coincident, the interference between the fronts of constant phase from beam 24 and specularly reflected beam 38 produce intensity patterns. The intensity patterns are imaged with a microscope objective. Specifically, coincident beams 60 enter objective 62 of microscope 64 to form an aerial image 66. If the beams are correctly aligned, and the variation in phase resulting from the reflection are within one wavelength, image 66 is an interference generated phase contrast image resulting from the interference of specularly reflected beam 38 and beam 24.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method of producing an interference generated phase contrast image, comprising the steps of:

generating a beam of collimated coherent light;

splitting the beam of collimated coherent light into a first beam and second beam with a first beam splitter;

splitting the first beam into third beam and fourth beam with a second beam splitter;

directing the third beam to a transparent phase object substantially located on a plane;

passing a first portion the third beam through the transparent phase object into a photorefractive holographic means, for producing and recording a hologram of the transparent phase object and for generating a phase conjugate beam of the transparent phase object from the beam of collimated coherent light;

splitting the phase conjugate beam into a first conjugate beam and a second conjugate beam with the second beam splitter;

splitting the second conjugate beam into a third conjugate beam and a fourth conjugate beam with the first beam splitter, directing the third conjugate beam with the first beam splitter to intercept a ground glass to produce a first spot viewed from above;

reflecting a second portion of the third beam from the transparent phase object to form a specularly reflected beam;

adjusting the entry of the specularly reflected beam into the second beam splitter with an adjustment means;

splitting the specularly reflected beam into a first and second reflected beam with the second beam splitter;

splitting the second reflected beam into a third reflected beam and a fourth reflected beam with the first beam splitter;

directing the third reflected beam with the first beam splitter to intercept the ground glass to produce a second spot viewed from above;

adjusting the position of the second spot with the adjustment means so that it falls coincident on the first spot, resulting in the first conjugate beam and the first reflected beam forming coincident beams;

intercepting the coincident beams with a image forming optical system;

recording a first image formed by the image forming system;

shifting the relative distance between the hologram and the transparent phase object a fraction a distance incommensurate with a wave length;

recording a second image formed by the image forming means;

subtracting the first image from the second image to obtain an interference generated phase contrast image.

2. The method of claim 1, wherein the step of shifting the relative distance between the hologram and the transparent phase object includes shifting the transparent phase object an incremental lateral distance; and wherein the step of subtracting the first image from the second image results in obtaining a combination interference generated phase contrast, gradient contrast image.

3. The method of claim 1, further comprising, prior to the step of intercepting the coincident beams with an image forming optical system, the steps of:

positioning a lens between the first beam splitter and the ground glass.

projecting an interference pattern of fringes on the lens; and utilizing the adjusting means until the pattern is symmetric about a central node.

4. The method of claim 1 wherein at least one of the first and second beam splitters is a 45° uncoated pellicle beam splitter.

5. The method of claim 1, further comprising, after the step of generating the beam of collimated coherent light, the step of rotating the polarization of the beam to lie in the plane of the second beam splitter.

6. The method of claim 1, wherein the adjustment means comprises at least one mechanically adjuster or piezoelectric adjuster.

7. The method of claim 1, wherein the optical imaging system comprises a microscope and a video camera.

8. The method of claim 1 wherein the recording means comprises a frame grabber with pixelated digital storage of the image and the subtracting means includes a digital process.

9. The method of claim 1, wherein the hologram is a photorefractive hologram of a barium titanate crystal.

10. The method of claim 1 further comprising the step of temporarily recording the hologram.

11. A method of producing a phase gradient contrast image, comprising the steps of:

generating a beam of collimated coherent light;

splitting the beam of collimated coherent light into a first beam and second beam with a first beam splitter;

splitting the first beam into third beam and fourth beam with a second beam splitter;

directing the third beam to a transparent phase object substantially located on a plane;

passing a first portion the third beam through the transparent phase object into a photorefractive holographic means, for producing and recording a hologram of the transparent phase object and for generating a phase conjugate beam of the transparent phase object from the beam of collimated coherent light;

splitting the phase conjugate beam into a first conjugate beam and a second conjugate beam with the second beam splitter;

splitting the second conjugate beam into a third conjugate beam and a fourth conjugate beam with the first beam splitter.

directing the third conjugate beam with the first beam splitter to intercept a ground glass to produce a first spot viewed from above;

reflecting a second portion of the third beam from the transparent phase object to form a specularly reflected beam;

adjusting the entry of the specularly reflected beam into the second beam splitter with an adjustment means;

splitting the specularly reflected beam into a first and second reflected beam with the second beam splitter;

splitting the second reflected beam into a third reflected beam and a fourth reflected beam with the first beam splitter;

directing the third reflected beam with the first beam splitter to intercept the ground glass to produce a second spot viewed from above;

adjusting the position of the second spot with the adjustment means so that it falls coincident on the first spot, resulting in the first conjugate beam and the first reflected beam forming coincident beams;

intercepting the coincident beams with a image forming optical system;

recording a first image formed by the image forming system;

shifting the transparent phase object an incremental lateral distance;

recording a second image formed by the image forming means;

subtracting the first image from the second image to obtain a phase gradient contrast image.

12. A method of producing a combination interference generated contrast phase contrast, gradient contrast image, comprising the steps of:

generating a beam of collimated coherent light;

splitting the beam of collimated coherent light into a first beam and second beam with a first beam splitter;

splitting the first beam into third beam and fourth beam with a second beam splitter;

directing the third beam to a transparent phase object substantially located on a plane;

passing a first portion the third beam through the transparent phase object into a photorefractive holographic means, for producing and recording a hologram of the transparent phase object and for generating a phase conjugate beam of the transparent phase object from the beam of collimated coherent light;

splitting the phase conjugate beam into a first conjugate beam and a second conjugate beam with the second beam splitter;

splitting the second conjugate beam into a third conjugate beam and a fourth conjugate beam with the first beam splitter.

directing the third conjugate beam with the first beam splitter to intercept a ground glass to produce a first spot viewed from above;

reflecting a second portion of the third beam from the transparent phase object to form a specularly reflected beam;

adjusting the entry of the specularly reflected beam into the second beam splitter with an adjustment means;

splitting the specularly reflected beam into a first and second reflected beam with the second beam splitter;

splitting the second reflected beam into a third reflected beam and a fourth reflected beam with the first beam splitter;

directing the third reflected beam with the first beam splitter to intercept the ground glass to produce a second spot viewed from above;

adjusting the position of the second spot with the adjustment means so that it falls coincident on the first spot, resulting in the first conjugate beam and the first reflected beam forming coincident beams;

intercepting the coincident beams with a image forming optical system;

recording a first image formed by the image forming system;

shifting the relative distance between the hologram and the transparent phase object a fraction a distance incommensurate with a wave length;

shifting the transparent phase object an incremental lateral distance;

recording a second image formed by the image forming means;

subtracting the first image from the second image to obtain a combination interference generated phase contrast, phase gradient contrast image.

13. A method of producing an interference generated image comprising the steps of:

generating a beam of collimated coherent light;

directing the beam along an axis through a transparent phase object;

passing a first portion the beam through the transparent phase object into a photorefractive holographic means, for producing and recording a hologram of the transparent phase object and for generating a phase conjugate beam of the transparent phase object from the beam of collimated coherent light;

reflecting a second portion of the beam from the transparent phase object to form a specularly reflected beam;

adjusting the specularly reflected beam and the phase conjugate beam to form coincident beams;

forming and recording an image of the coincident beams;

shifting the transparent plate object axially to form a shifted beam;

forming and recording a second image of the shifted beam;

subtracting the first image from the second image to obtain an interference generated image.

14. A method of producing a phase gradient contrast image comprising the steps of:

generating a beam of collimated coherent light;

directing the beam along an axis through a transparent phase object;

passing a first portion the beam through the transparent phase object into a photorefractive holographic means, for producing and recording a hologram of the transparent phase object and for generating a phase conjugate beam of the transparent phase object from the beam of collimated coherent light;

reflecting a second portion of the beam from the transparent phase object to form a specularly reflected beam;

adjusting the specularly reflected beam and the phase conjugate beam to form coincident beams;

forming and recording an image of the coincident beams;

shifting the transparent plate object transverse to the axis to form a shifted beam;

forming and recording a second image of the shifted beam;

subtracting the first image from the second image to obtain an interference generated image.

15. A holographic microscope system for phase imaging of a transparent phase object, comprising:

a source for a beam of collimated coherent light;

a first beam splitter receiving and splitting the light beam into first and second beams;

a stage for supporting the transparent phase object, wherein the second beam enters the transparent phase object at the stage, and wherein a first portion of the second beam is reflected by the transparent phase object to form a specularly reflected beam;

means for adjusting the position of the stage in at least two orthogonal directions;

a photorefractive hologram recording crystal receiving a second portion the second beam and forming a photorefractive hologram, the crystal generating a phase conjugate beam;

means for aligning the phase conjugate beam and the specularly reflected beam;

an objective for receiving an image of the beam; and a processor for recording and comparing at least two images.

16. A holographic microscope system according to claim 15, wherein the aligning means comprises a second beam splitter directing the phase conjugate beam and the specularly reflected beam to a ground glass, whereupon spots are formed on the ground glass from the phase conjugate beam and the specularly reflected beam, wherein movement of the stage by the adjusting means results in the spots falling coincident on the ground glass.

* * * * *